(12) United States Patent
James et al.

(10) Patent No.: US 11,531,084 B1
(45) Date of Patent: Dec. 20, 2022

(54) SYSTEM AND METHOD FOR MANAGING HEAT DISSIPATION IN AN ANTENNA ARRAY

(71) Applicant: Fortem Technologies, Inc., Pleasant Grove, UT (US)

(72) Inventors: David Earl James, Orem, UT (US); Jon Erik Knabenschuh, Orem, UT (US); Matthew Robertson Morin, Provo, UT (US); James David Mackie, Provo, UT (US); Chester Parker Ferry, Pleasant Grove, UT (US); Brandon Robert Hicks, Saratoga Springs, UT (US); Kendall James Fowkes, Provo, UT (US); James Harrison Hofer, Jr., Orange, CA (US)

(73) Assignee: Fortem Technologies, Inc., Pleasant Grove, UT (US)

( * ) Notice: Subject to any disclaimer, the term of this patent is extended or adjusted under 35 U.S.C. 154(b) by 438 days.

(21) Appl. No.: 16/839,568

(22) Filed: Apr. 3, 2020

(51) Int. Cl.
| | |
|---|---|
| *G01S 7/03* | (2006.01) |
| *H01Q 1/22* | (2006.01) |
| *H01Q 1/02* | (2006.01) |
| *G01S 7/35* | (2006.01) |

(52) U.S. Cl.
CPC .............. *G01S 7/032* (2013.01); *G01S 7/352* (2013.01); *H01Q 1/02* (2013.01); *H01Q 1/2283* (2013.01)

(58) Field of Classification Search
CPC ........ H01Q 1/02; H01Q 1/2283; G01S 7/032; G01S 7/352
See application file for complete search history.

(56) References Cited

U.S. PATENT DOCUMENTS

| | | | |
|---|---|---|---|
| 2021/0265276 A1* | 8/2021 | Wu | ........................ H01L 21/561 |
| 2022/0173497 A1* | 6/2022 | Liu | ........................ H01L 23/66 |

* cited by examiner

*Primary Examiner* — Marc Anthony Armand (57) ABSTRACT

A radar system is generated by a process including generating a first substrate layer adjacent to a ground plane of a patch antenna array in the radar system, etching an opening in the substrate layer, inserting a mechanically-locking foot of a threaded insert into the opening, adding a second substrate layer adjacent to the first substrate layer to embed the threaded insert, applying a thermal coupling between a heat sink layer and the second substrate layer of the radar system and screwing a screw through the heat sink layer and into the threaded insert to adhere the heat sink layer to the radar system. Such a radar system can enable the attachment of the heat sink layer to the radar system in a removable fashion such that the heat sink layer can be removed by removing the screw and repairs can be done without damaging respective layers.

20 Claims, 8 Drawing Sheets

SYSTEM AND METHOD FOR MANAGING HEAT DISSIPATION IN AN ANTENNA ARRAY

TECHNICAL FIELD

The present disclosure relates to heat dissipation and more specifically to a new structure in an antenna array for managing heat dissipation and easier access to components.

BRIEF INTRODUCTION

In certain radar applications, such as radars configured on drones to track objects within the air, the radar will be a printed circuit board of an array of antennas. Each antenna generates heat and the overall radar includes a number of different layers of construction.

For example, the Fortem Technologies "TrueView" Radar provides a compact radar solution that can be configured on a drone and can provide warnings of intrusive or non-cooperative air traffic. The structure of such a radar can include a flat outer surface representing a first layer and can have embedded therein transmission antennas and receiving antennas. Bonded to the first layer can be an RF board, followed by a digital board and finally an I/O layer which can include couplings for cables or other channels.

One challenge with such a structure is a need to have a flat surface on the first layer. Any extension that protrudes from the flat surface, such as the head of a screw, can reflect radar signals either transmitted from the transmission antennas or that are received from the object. The boards get hot if any object, like a screw head, distorts the waves that are transmitted or received.

DETAILED DESCRIPTION

Various embodiments of the disclosure are discussed in detail below. While specific implementations are discussed, it should be understood that this is done for illustration purposes only.

Brief Introduction

The present disclosure generally relates to a new structure for constructing a radar that enables the management of heat dissipation and provides a flat surface in the first layer of the radar which thereby avoids structures, such as the heads of screws, which can impact the purity of electromagnetic waves that are transmitted by the radar or received at the radar. The antenna used in the examples herein is a printed circuit board with an array of patch antennas. The purpose of the structure is to enable components to be attached to the first layer containing the antenna arrays in an efficient manner, but in a way that does not result in any protrusion or extension from the surface of the first layer. The overall structure disclosed enables the antenna array to be attached to a heat sink component in a removable manner such that the heat sink can be removed and components of the antenna array can be repaired or replaced.

In some antenna arrays, the structure also includes an outer lip or flange that would extend around the exterior perimeter of the first layer. This also is problematic as the outer lip or flange would also cause reflections of electromagnetic signals either transmitted or received. Accordingly, the desire for an extremely flat or substantially flat surface which contains the transmit and receive antennas has driven the solution disclosed herein. The solution enables an RF board and other layers (such as a digital board and/or I/O board) to be attached to a first layer having the antenna array and without the resulting structure having protrusions on the surface of the antenna array. The RF board can also be attached to a heat sink in a removable manner using the etching process disclosed herein.

One of the physical aspects of this disclosure is that the first layer of the antenna has no edge or no edge piece. Utilizing the structure disclosed herein, the additional layers or boards can be attached to the first layer without the need of an edge component.

An example radar system includes a first layer having an array of antennas configured thereon, a ground plane layer, and a first substrate layer having an etched opening therein. The first substrate layer can have multiple etched openings, each for receiving a respective threaded insert. The threaded insert has a body and a mechanically-locking foot or flange which is inserted or embedded in the etched opening. A second substrate layer can be adjacent to the first substrate layer and cover at least a portion of the mechanically-locking foot of the threaded insert to secure the threaded insert in the first substrate layer and the second substrate layer. A temporary, coated plug is used in the insert during the manufacturing process. The plug is removed after an etching is performed in a third layer covering the insert and the plug.

The system includes a heat sink layer having an opening configured therein such that a screw can be threaded through the opening configured in the heat sink layer, through the third layer and into the threaded insert. The screw attaches the heat link layer to the other layers (RF board) and both provides a heat sink function for the heat generating components on the RF board and enables the heat sink layer to be removed for repairing or replacing RF components.

A method is also disclosed. The example method includes generating a first substrate layer adjacent to a ground plane of a patch antenna array in a radar system, etching an opening in the substrate layer, inserting a mechanically-locking foot of a threaded insert into the opening, inserting a coated temporary plug into the threaded insert, adding a second substrate layer adjacent to the first substrate layer to embed the threaded insert, adding a third substrate layer that covers the threaded insert and coated temporary plug, etching an opening in the third substrate layer to enable removal of the coated temporary plug, applying a thermal coupling between a heat sink layer and the third substrate layer of the radar system and screwing a screw through the heat sink layer and into the threaded insert to removably adhere the heat sink layer to the radar system.

The overall process disclosed includes the concept of creating an RF board having a first etching to enable the insertion of a threaded insert, the use of the coated temporary plug in the insert for the manufacturing process, generating additional layers to embed the insert and add RF components to the RF board, and additional etching to reveal the insert and the temporary plug. The temporary plug is removed and the process includes applying a thermal paste and connecting of the RF board to a heat sink using screws through the heat sink and into the insert. Multiple inserts and screws are used to removably attach the heat sink to the RF board.

DETAILED DESCRIPTION

As the concepts disclosed herein may utilize compute devices, the disclosure first describes a general computing device. Other components and configurations may be used without parting from the spirit and scope of the disclosure. While the primary embodiment relates to a radar system structure, a compute element may also be utilized or included in the radar system or used on connection with the radar system such as to process signals received to evaluate tracked objects via the radar system. Accordingly, the disclosure now turns to FIG. 1 which describes a compute device generally.

Figure 1:
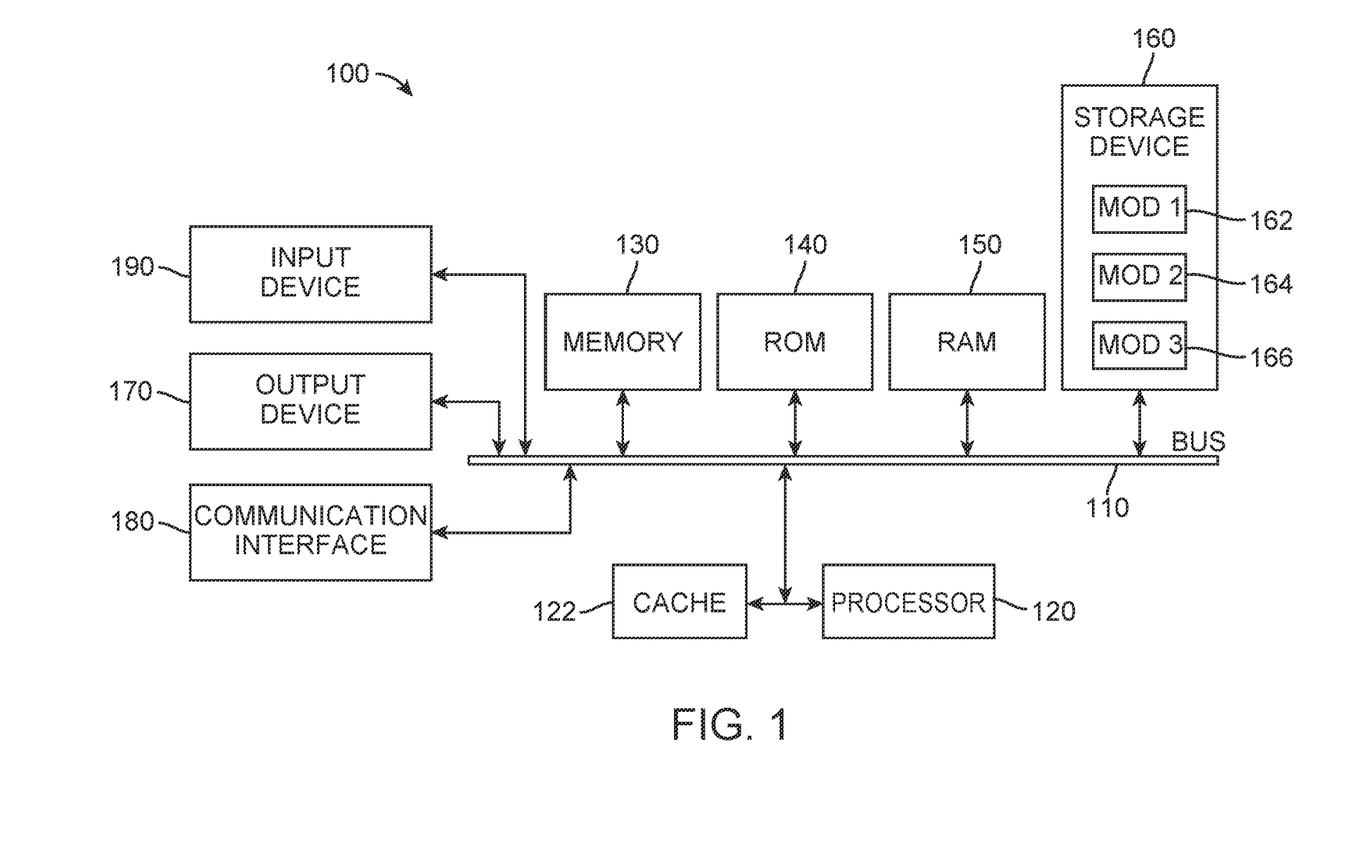
FIG. 1 illustrates an example system embodiment.

With reference to FIG. 1, an exemplary system and/or computing device 100 includes a processing unit (CPU or processor) 120 and a system bus 110 that couples various system components including the system memory 130, such as read only memory (ROM) 140 and random access memory (RAM) 150, to the processor 120. The system 100 can include a cache 122 of high speed memory connected directly with in close proximity to, or integrated as part of, the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example, the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are configured to control the processor 120. These modules may be stored on the storage device 160 and loaded into RAM 150 or memory 130 at runtime or may be stored in other computer-readable memory locations.

Figure 2:
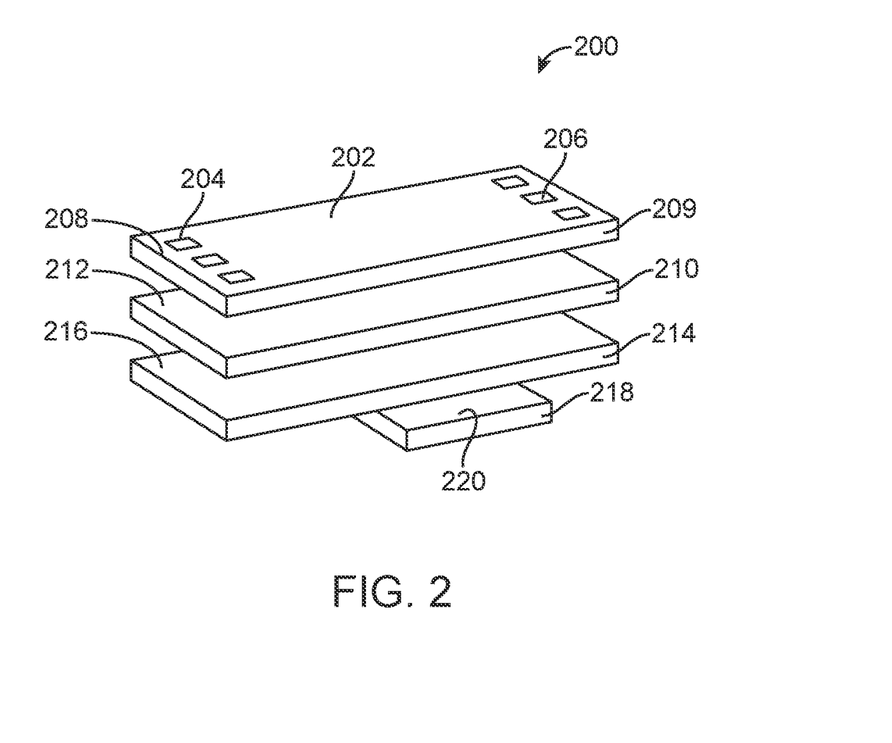
FIG. 2 illustrates an example of multiple layers of the antenna system.

The disclosure now turns the details of the new antenna structure. FIG. 2 illustrates example layers associated with an antenna array. Each layer can include a printed circuit board with the particular structure needed for that layer. For example, the layers can include a layer having patch antennas, an RF board layer, a digital board layer or an I/O layer. The antenna 200 can include a first layer 202 that can have thereon patch antennas such as a set of transmission antennas 204 and a set of receiving antennas 206. The surface of the layer 202 is what is desired to be flat without bumps, screw heads, or any raised surfaces such as a lip along the perimeter 208. Part of the result which drives the innovation disclosed herein is the desire for a smooth surface on the outer layer 202 for optimal transmission and reception of electro-magnetic signals. The antennas are very sophisticated and it is essential that the surface is smooth and flat with no edges of the facing surface. This characteristic of the antenna is important in maintaining the integrity of the transmitted and received signals.

A plastic or teflon-like layer covers the surface 202 to provide protection and to make the layer smooth and consistent. The material used to provide the outer cover of the surface 202 is chosen such that it does not interfere with the electromagnetic signals transmitted or received from the antennas.

A second layer 210 can be an RF board layer that includes RF driving components which generate heat. Layer 202 can include a ground plane 209. A third layer 214 can include a digital board for signal processing and a fourth layer 218 can provide a physical connection to the antenna 200 such as a coaxial cable or other type of physical connection.

The antenna structure 200 is assumed to include the necessary wiring for communication between the different layers such that signals transmitted from the antenna or signals received from the antenna can be communicated to or from the antenna 200.

The various layers can be bonded in different ways and using different materials. Bonding can be adhesive bonding which provides a greater deal of strength or can be a thermal bonding for the purpose of heat dissipation using a material such as a thermal paste in a bonding layer. A bonding layer 212 is shown between layer 202 and layer 210. A bonding layer 216 is shown between layer 210 and layer 214. Similarly, a bonding layer 220 is shown between layer 218 and layer 214. Various components in the antenna 200 generate heat and can get very hot. Accordingly, another aspect of this disclosure is providing a structure which dissipates heat appropriately. Another driving need for the innovation disclosed herein is the desirability of being able to gain access to components within the antenna 204 for repair without ruining the overall antenna. Using adhesive bonding materials on the layers together will essentially result in the need to destroy components or layers of the antenna 200 if one were to desire to gain access, for example, to the RF board 210.

In one example, layer 214 might be a heat sink layer that needs to be attached to the RF board 210 in a manner that is removable but that enables the heat sink to draw heat away from heat-generating components. This disclosure provides an improved approach is for generating layers 202 and 210 utilizing inserts, temporary plugs, thermal paste, and screws in order to attach different layers in a manner that is removable to gain access to components on the RF board 210.

The solution disclosed herein enables a bonding to occur between the respective layers using a thermal bonding that is reversible or capable of being separated without destroying the respective layers or without an excess of difficulty to gain access to RF elements or other elements for repair. The following disclosure provides more detail regarding the use of a mechanically-locking component on an insert, a coated temporary plug, multiple etching steps, where and how to apply thermal bonding, and the use of screws to attached heat sink layer to an RF board in a particular way to enable easy removal of the heat sink for repair or replacement of RF components.

Figure 3A:
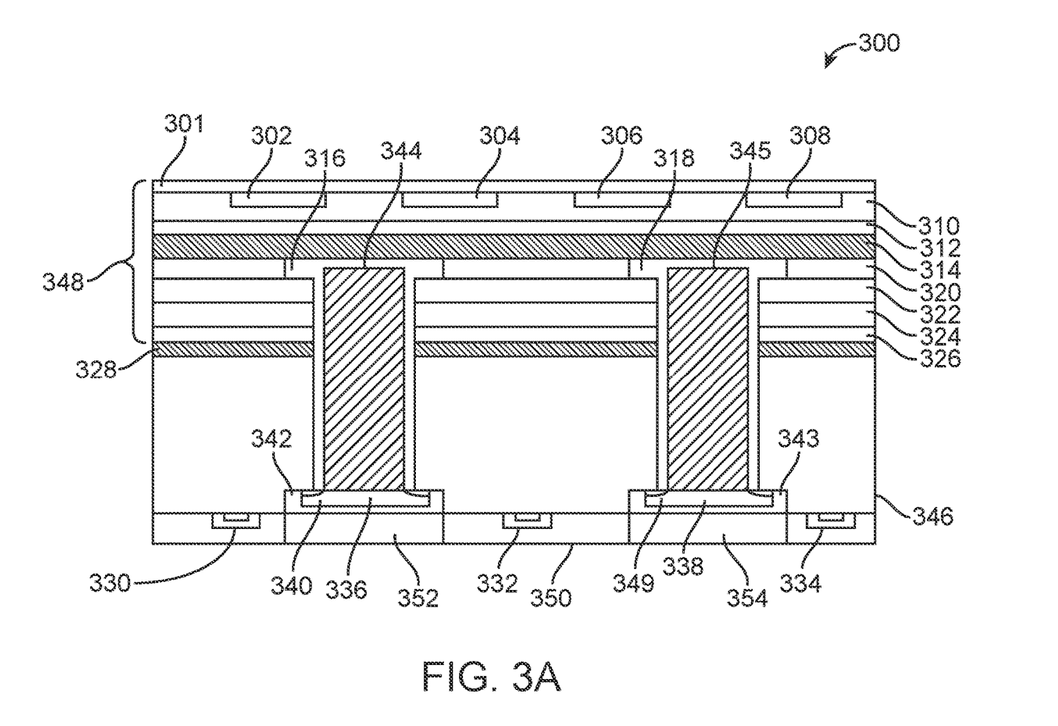
FIG. 3A illustrates the structure of the threaded insert and bolt applicable to the present disclosure.
Figure 4:
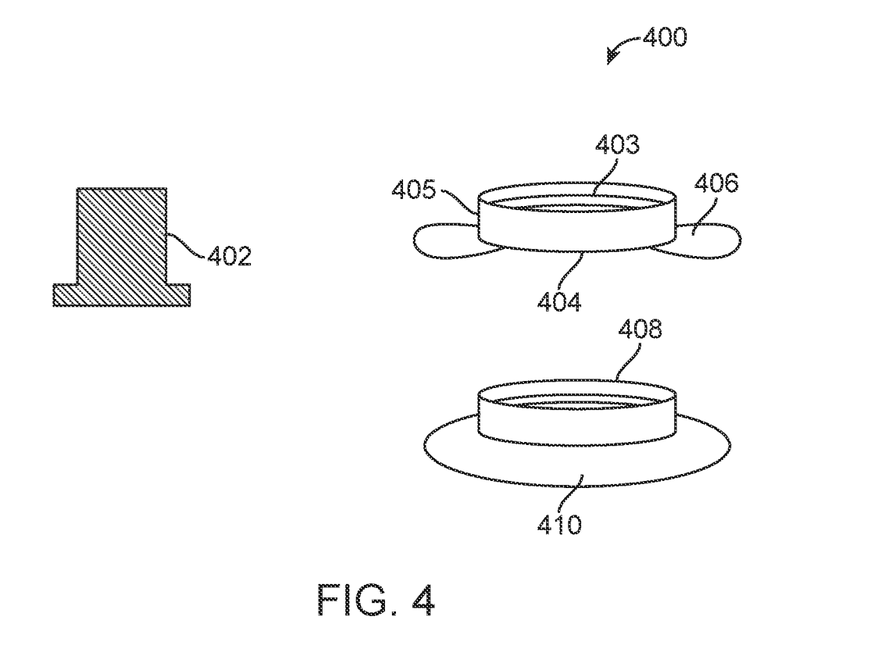
FIG. 4 illustrates a threaded insert of various types.

FIG. 3A illustrates the basic component and improvements in antenna or radar system 300. As shown, a first layer 310 includes patch antennas 302, 304, 306 and 308. A thin layer or cover 301 is placed on the surface of the antenna or radar system 300. The layer 310 and/or 312 can represent a dielectric material that separates the antenna 302, 304, 306 and 308 from the ground plane 314. A substrate 312 can be provided as is the practice in generating antennas generally. A ground plane 314 is shown which is necessary for antenna transmission. A substrate layer 320 is provided beneath the ground plane. The innovation disclosed herein is to etch via a laser, acid, or other means, into the substrate layer 320 some openings into which a respective threaded insert having a certain configuration can be placed. The opening can be circular, cylindrical, hexagon, square, or shaped to correspond to a threaded insert such as threaded insert 404 or 408. At least one etched opening is created in the substrate layer 320. It is envisioned that multiple openings will be created as strategic locations such as around the perimeter of the substrate layer 320 and at various positions in an interior portion of the substrate layer 320 which positions can be chosen based on a location of RF components that will be built into an RF board.

FIG. 4 shows an example configuration 400 of a threaded insert 404/408 and bolt 402 pair which can be used according to this disclosure. One example configuration includes 2 rims, feet, base or mechanically-locking feet 406 extending from opposite portions of the threaded insert as shown. In another aspect, the mechanically-locking foot 410 as part of threaded insert 408 can extend in all directions from the threaded insert 408. The threaded insert in any respect should include at least some mechanically-locking foot component in order for the bolt to not be embedded within the substrate layer 320. The threaded insert 404 includes a body portion 405 that can be cylindrical in shape and can have an interior surface that is threaded 403. Other shapes are contemplated as well. A height of the body 405 of the threaded insert 404 can be configured as necessary depending on the overall depth of the antenna array shown in FIG. 3. Typically, the interior surface 403 is cylindrical and threaded, but the interior surface 403 and the exterior surface 405 can be cylindrical, threaded, or configured in any other shape such as a square, rectangle, hexagon, and so forth. The mechanically-locking foot 406, 410 can have other configurations as well, such as square components, rectangular components, and different thicknesses. A typical examples includes 2 "feet" or mechanically-locking components, but the configuration could also include a single extending component or three or more components. The purpose of the respective component is to enable the body 405 to be secured in the appropriate layer of the system.

FIG. 3A shows the areas 316, 344, 318 and 345 into which the threaded insert will be embedded after etching a space in the layer 320. Once the areas in the substrate layer 320 are etched, and the respective threaded insert or nut 316 is placed in each opening or etched area, the remaining substrate layers 322, 324 can be added to the overall substrate. In one aspect, layer 348 represents the first antenna layer shown in FIG. 2. In one aspect, the threaded insert 316 is positioned adjacent to the ground plane 314 such that it is in physical contact with the ground plane. In another aspect, there is a layer between the threaded insert and the ground plane 314. A coated temporary plug (discussed more below) is inserted into each respective threaded insert such that during the process of adding layers, the insert does not fill with material.

A thermal layer 328 can be provided between the antenna layer 348 and an RF board layer 346. As noted above, this is not meant to be an adhesive layer, but rather a thermal conducting layer which can be bound using a thermal paste. In the RF Board layer 346, a number of RF elements 330, 332, 334 are provided to drive the patch antenna elements 302, 304, 306, 308. These RF elements generate heat that needs to be dissipated. Not shown are communication channels or copper vias between the RF elements 330, 332, 334 in the respective patch antennas through the respective layers. For each patch antenna, there is a corresponding RF element that gets hot. The layer 346 can include a metal layer that draws heat away from the various elements 330, 332, 334.

Filler screws or coated temporary plugs 336, 338 are screwed into each respective threaded insert 316, 318 and with a respective screw head 340, 349. The filler plugs 336, 338 are temporarily used for the manufacturing process and are taken out before attaching the component 300 to a heat sink shown in FIG. 3B. The filler plugs 336, 338 are needed during manufacturing so that the holes do not fill up with material. The filler plugs 336, 338 could also be called temporary inserts or temporary screws. The layer 346 can include an etching, opening, cavity or counterbore 342, 343 which is complementary in nature to the shape of the head 340 of the temporary plug 336, 338. Each position within the layer 346 at which a plug will be applied will have the counterbore 342 in order to enable the head 340 of the plug 336, 338 to secure the layer to the radar system. The counterbore 342 can be flat or beveled depending on the configuration of the head 340 of the plug 336, 338.

There is an issue of the plug 336, 338 being bonded to the threaded elements 316 as the layers are laminated. Therefore, a silicone sealant or other material is used to coat the plugs 336, 338 before they are screwed into the threaded element 316. This insures that the screw is capable of being unscrewed after the various necessary layers are laminated. The silicone sealant can be, for example, a combination of RTV (room-temperature-vulcanizing) silicone and lighter fluid. The combined solution can be 70% RTV silicone and 30% lighter fluid in one example. Of course other combinations are contemplated as well. The filler plug 336, 338 needs to be coated with the material so that it does not bond to the threaded element 316, 318 in the manufacturing process.

In another example, the assembly method with respect to the use of a material to coat the plugs 336, 338 can include putting small, equal amounts of silicone sealant and charcoal lighter fluid in a 1-OZ cup and mix until it is smooth to make a silicone solution. Next, dip the plug 336, 338 into the silicone solution and turn the plug into the nut until the plug 336, 338 is flush with the front and back of the nut. Next, any excess silicone solution is wiped from the assembly.

In one aspect, as part of the manufacturing process for component 300, a copper layer 350 is added over layer 346. The addition of this copper layer will cover the screws 336, 338. Openings 352, 354 can be etched using a laser or other mechanism to reveal and enable the removal of plugs 336, 338. The plugs shown in FIG. 3A can be temporary screws used in the manufacturing process which are then removed for attaching the component 300 to another component 360 of the radar system shown in FIG. 3B. Component 360 can be a metal heat sink. Between layer 350 and heat sink 360 can be electromagnetic interference gaskets to separate components 330, 332, 334 from interfering with each other.

The overall manufacturing process includes a first phase shown in FIG. 3A in which filler screws or plugs 336, 338 are used for the initial creation of the layers including an etching of openings 352, 354. The component 300 is then ready to be attached to a heat sink or component 360 shown in FIG. 3B. With the temporary plugs removed, screws 362, 364 can be used to attach the heat sink 360 to the component 300. Each screw 362, 364 can include a screw head 366, 368 which is complementary to a counterbore 380, 382 positioned in the heat sink 360.

Figure 3B:
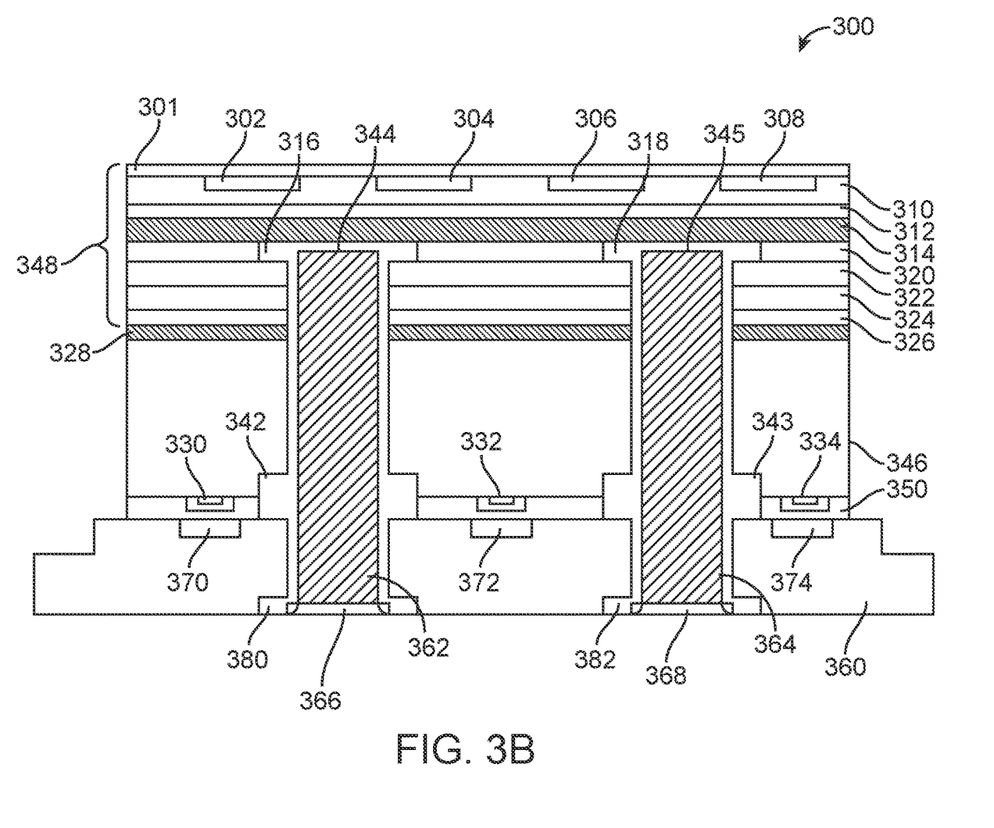
FIG. 3B illustrates the structure attached to a heat sink.

In an alternate example, the screws 362, 364 do not have heads and thus differ from what is shown in FIG. 3B. The screws are typically provided as gap fillers and in one aspect there is no need for a head on the screws as they are ultimately just removed.

Elements 330, 332, 334 can be positioned also in layer 350 and heat sink 360 can have cutout corresponding openings 370, 372, 374 that match respectively to locations within layer 350 where components 330, 332, 334 reside. The size of the openings 370, 372, 374 can be, for example, a quarter wavelength in height. The thermal paste or thermal pad can be positioned between layer 350 and heat sink 360.

With this structure, if there is a need to replace an RF element 330, 332, 334, then a technician only needs to unscrew the screws 362, 364 and separate or remove the thermal coupling element between layer 350 and heat sink 360 and make the appropriate repairs. To put the antenna back together, a new layer of thermal bonding can be applied and the layer 360 can be screwed back onto layer 350 without damaging the components 330, 332, 334. Generating the radar system includes laminating various internal layers of the boards. The concept of etching out a portion of the substrate layer 320 in a patch antenna system and placing therein a threaded insert having a mechanically-locking foot portion that extends from the threaded insert for at least part of a circumference of the threaded insert for holding in place is novel and enables the overall benefits disclosed herein. After the threaded insert is placed in the etched portion, additional substrate layers 322, 324 are added to complete the overall substrate layering.

It is noted that the structure of the screws 362, 364 and the respective threaded insert 316, 318 are configured such that a length of the respective screw will not extend so far such that it connects with the ground plane 314. Thus, space 344, 345 is shown as providing an opening or a distance between the respective threaded screw 362, 364 and the ground plane 314. In this respect, the configuration could be characterized as a blind via in that there is an etching that enables the threaded element 316 to be embedded therein but the opening does not go through the entire board—it stops at the ground plane 314 or near the ground plane 314.

The layer 360 can be a metal (such as aluminum or other metal) that is used to draw heat from the respective RF elements 330, 332, 334 and towards the back of the radar system 300. An air shroud and/or fans or other heat dissipation elements can be also used to pull the heat out of the radar system 300.

Figure 5:
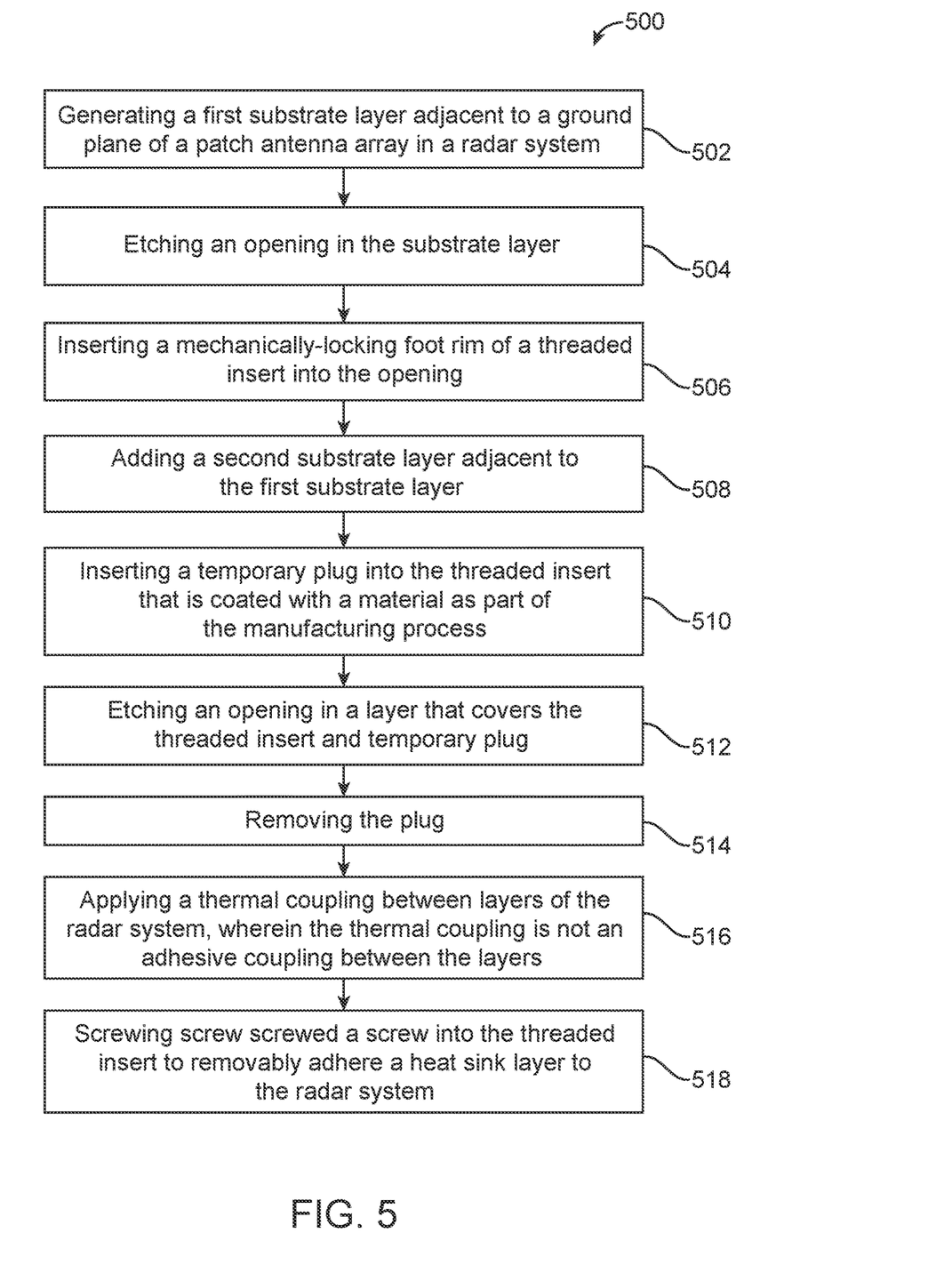
FIG. 5 illustrates a method embodiment.

FIG. 5 illustrates an example method. The method includes generating a first substrate layer adjacent to a ground plane of a patch antenna array in a radar system (502), etching an opening in the substrate layer (504) and inserting a mechanically-locking foot of a threaded insert into the opening (506). The threaded insert includes the mechanically-locking foot that is configured to conform at least generally to a shape and depth of the opening that is etched into the substrate later. The threaded insert includes a body portion that is threaded on an inner surface and is cylindrical in shape in one example. The method includes adding a second substrate layer adjacent to the first substrate layer (508), wherein the second substrate layer covers a portion of the mechanically-locking foot of the threaded insert so as to embed the threaded insert into the substrate for use in receiving a screw that secures other layers to the antenna.

The method includes inserting a temporary plug into the threaded insert that is coated with a material as part of the manufacturing process (510) and etching an opening in a layer that covers the threaded insert and temporary plug (512), removing the temporary plug (514) and applying a thermal coupling between layers of the radar system, wherein the thermal coupling is not an adhesive coupling between the layers (516). The method further includes screwing a screw into the threaded insert to adhere a heat sink layer to the radar system (518). In one aspect, the layer, which can be adhered to the radar system utilizing the screw, can include an etched portion, a counterbore, an opening or a cavity that can be complementary to a head of the screw and enables the heat sink layer to be secured to the radar system. In another aspect, the screws do not have heads and are thus not used for securing any layer. In this regard, the screws are used as gap-fillers only. Heat dissipation elements are thereby secured to the radar system in such a way as to enable the removal of the heat sink layer to be able to access RF elements for replacement or repair.

In another aspect, this disclosure covers a radar system having a first antenna layer that includes one or more patch antennas, a substrate, and a ground plane. The one or more patch antennas are configured on a first side of the ground plane. On the opposite side of the ground plane from the first side is configured a substrate in which one or more openings are etched so as to receive respectively one or more threaded inserts configured with a mechanically-locking foot and a body, wherein the body is internally threaded to receive a screw for securing a second layer to the first antenna layer. The overall substrate for the first antenna layer includes a first substrate layer that has one or more of the etched openings and which receive respectively one or more threaded inserts in which each respective threaded insert has a mechanically-locking foot configured to be secured within the opening that is etched. After placing the one or more threaded temporary plugs that are coated with a composite material in the respective openings, a second substrate layer is laid so as to cover the respective mechanically-locking foots of the respective threaded inserts. In some aspects, a third and/or a fourth substrate layer can also be laid to establish the overall substrate for the layer. One layer is established over the inserts and the plugs such that openings in the layer need to be etched to enable removal of the plugs.

The radar system includes a thermal coupling between the component and a heat sink such that heat transfer of heat generating elements to heat transfer elements is enabled. The thermal coupling is expressly not an adhesive coupling in that it is made of a material such as a thermal paste that is removable to enable a technician to remove a layer 360 from the radar system without damaging the components and to be able to access and repair internal components to the radar system. The material is non-conductive and can also be a thermal pad between layer 350 and layer 360. For example, one could use a thermal grease compound between the layers. Any heat paste, heat sink compound, heat sink paste, thermal compound, thermal gel, or thermal interface material can be used to connect the layers as an interface between a layer having a heat source and heat sink. Some compounds are liquid or are applied as a foam. Any of these thermal compounds can easily be removed where a component of the radar system needs to be repaired. They typically are non-hardening and thus removable. This is because the physical attachment of the layers to each other is achieved by use of the threaded insert and bolt approach disclosed herein. Once removed, an element can be replaced or repaired and the thermal compound is reapplied and the radar system can easily be reassembled.

The number of pairs of threaded inserts and bolts/screws can vary depending on the size and the strength needed to secure layers together in the radar system 300. The radar system will utilize at least one pair of a threaded insert and bolt/screw and will typically have under 50 pairs of threaded inserts and bolts/screws.

In some aspects, such as is shown in FIG. 2, there are multiple different layers in a radar system. The present disclosure provides some general concepts regarding how to etch a portion of a layer in order to receive a mechanically-locking foot of a threaded insert which is to be embedded in the layer or layers which can then be used to receive a screw for attaching another layer to the radar system. The approach can be used to attach, for example, layer 210 to layer 202 or to attach layer 214 to layer 210 or layer 202. The particular number of layers is not necessarily material in the core concept disclosed herein, but relates to the embedding of the threaded insert in the manner shown in attaching a layer to the radar system utilizing a screw that is screwed into the threaded insert. In one example, the screw could be long enough to attach both layer 214, and layer 210 to the antenna layer 202.

Furthermore, one aspect of this disclosure involves etching the substrate layer that is adjacent to the ground plane 314. While this is a desirable approach, another aspect could include etching the opening in layer 322 or layer 324 of the substrate. The various substrate layers may be made from the same material or different materials. Again, the broader concept disclosed herein is the etching out of a substrate layer and opening which shall receive a mechanically-locking foot of a threaded insert for the purpose of receiving a screw that is used to attach a layer to the radar system.

In one embodiment, the etching of the openings occurs in the same layer 320 as shown in FIGS. 3A and 3B. It is noted, however, that depending on the desired configuration, that the etchings could be in different layers. For example, a radar system could include one or more etchings in layer 320 and one or more etchings in layer 322 and/or one or more etchings in layer 324. The respective screw length would vary if the etchings and embedded threaded inserts were in different layers of the radar system. The varying of the levels of the etchings might benefit the radar system with respect to heat dissipation or enabling component configurations in different ways.

Figure 6:
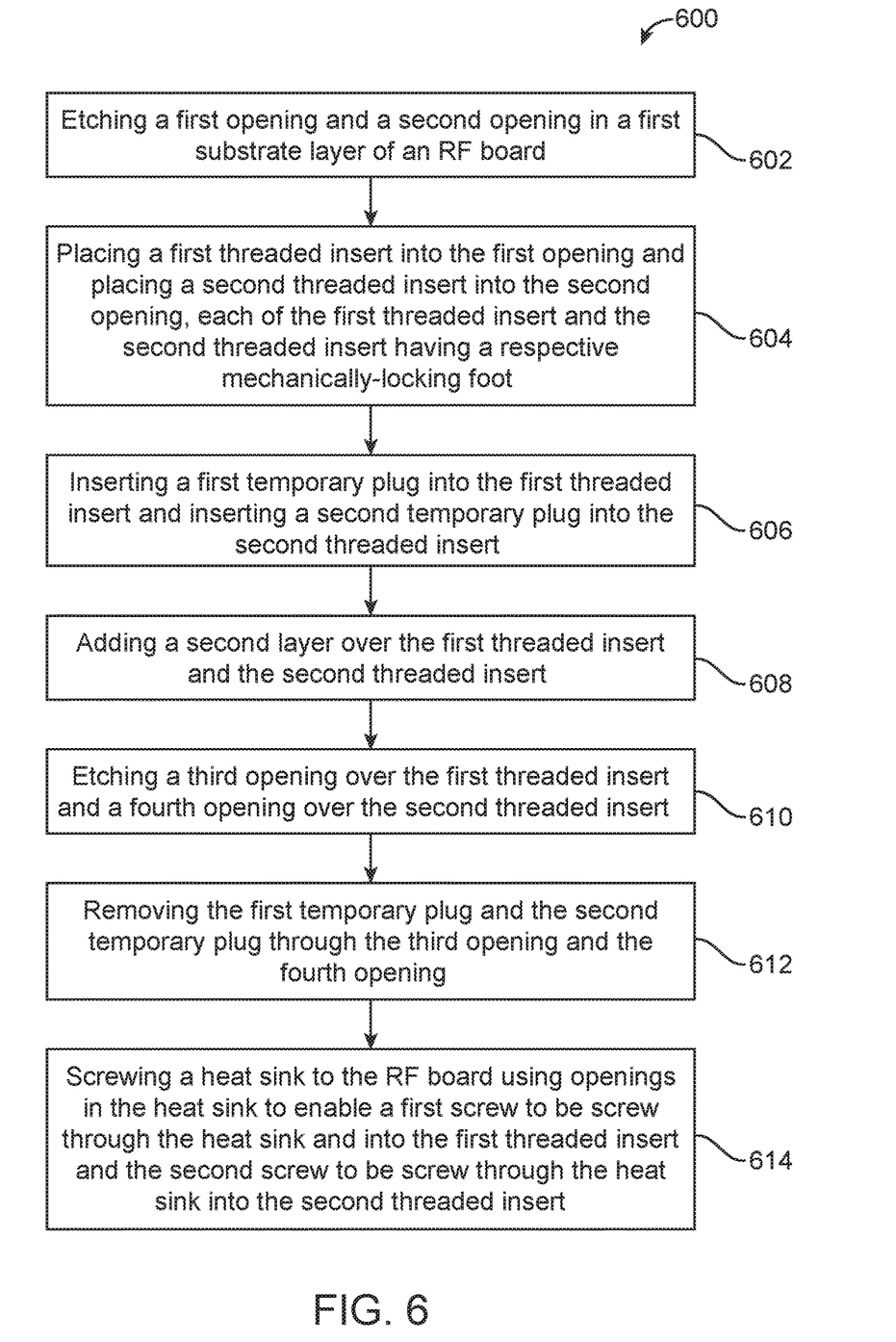
FIG. 6 illustrates another method embodiment.

FIG. 6 illustrates yet another example method disclosed herein. The method includes etching a first opening and a second opening in a first substrate layer of an RF board (602), placing a first threaded insert into the first opening and placing a second threaded insert into the second opening, each of the first threaded insert and the second threaded insert having a respective mechanically-locking foot (604), inserting a first temporary plug into the first threaded insert and inserting a second temporary plug into the second threaded insert (606), adding a second layer over the first threaded insert and the second threaded insert (608), etching a third opening over the first threaded insert and a fourth opening over the second threaded insert (610), removing the first temporary plug and the second temporary plug through the third opening and the fourth opening (612) and screwing a heat sink to the RF board using openings in the heat sink to enable a first screw to be screw through the heat sink and into the first threaded insert and the second screw to be screw through the heat sink into the second threaded insert (614). A thermal paste can be used between the RF board and the heat sink. A radar system generated according to the process described herein has improved characteristics in that the heat sink can be easily removed from the RF board to gain access to RF components for repair or replacement. Claims components can include a product by process claim, method claims, system or device claims, as well as claims directed to any individual component. For example, claims might be directed to the RF board itself separate from the heat sink. Other claims might be directed to the heat sink itself which is configured to be attached to the RF board having its configuration with holes prepared to receive screws and indentations or cavities which are configured to be complementary to RF components on the RF board at a specified distance from a respective RF component for drying heat therefrom.

Figure 7:
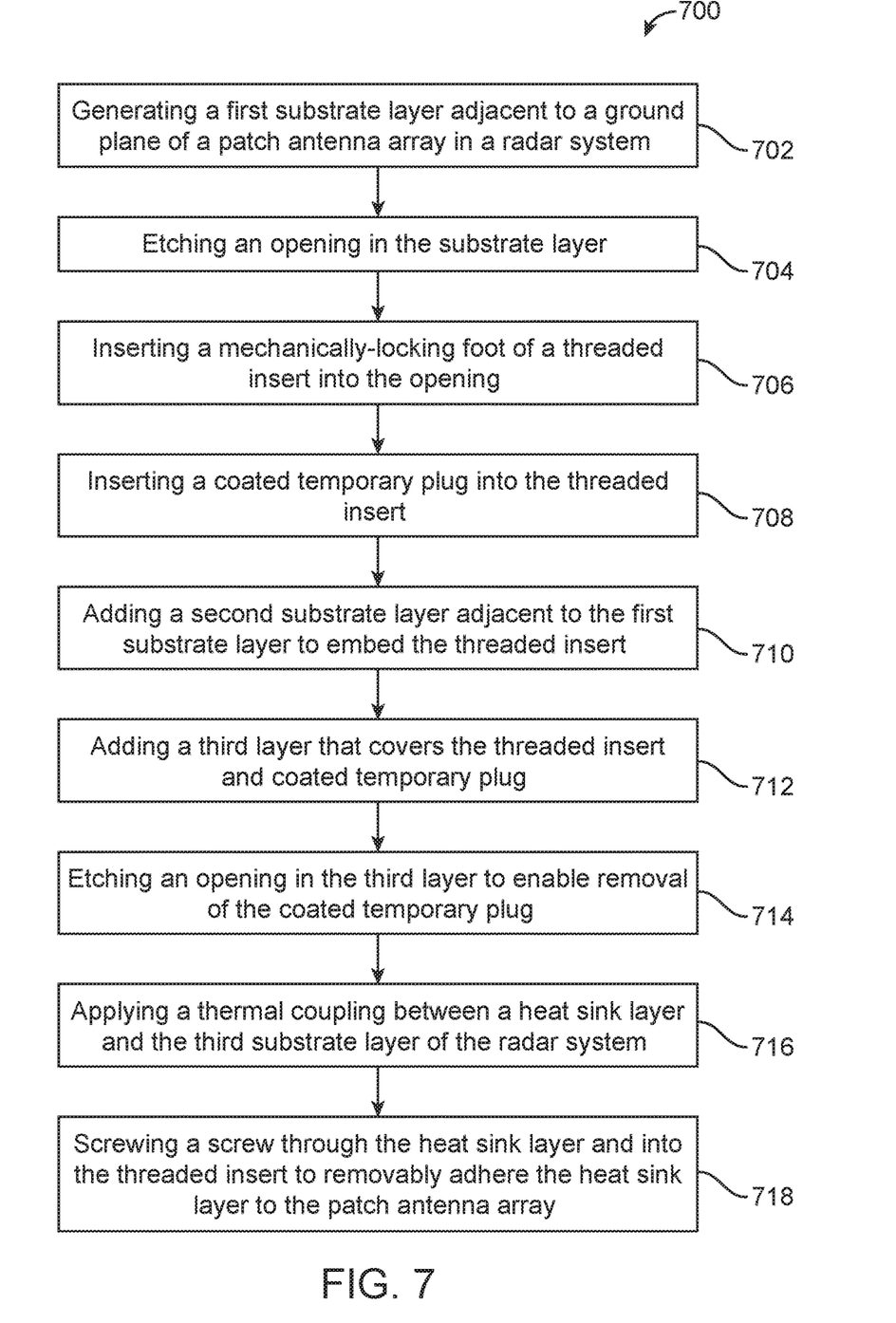
FIG. 7 illustrates yet another method embodiment.

FIG. 7 illustrates another method example. A method includes generating a first substrate layer adjacent to a ground plane of a patch antenna array in a radar system (702), etching an opening in the substrate layer (704), inserting a mechanically-locking foot of a threaded insert into the opening (706), inserting a coated temporary plug into the threaded insert (708), adding a second substrate layer adjacent to the first substrate layer to embed the threaded insert (710), adding a third layer that covers the threaded insert and coated temporary plug (712), etching an opening in the third layer to enable removal of the coated temporary plug (714), applying a thermal coupling between a heat sink layer and the third substrate layer of the radar system (716) and screwing a screw through the heat sink layer and into the threaded insert to removably adhere the heat sink layer to the patch antenna array (718).

The second substrate layer can cover a portion of the mechanically-locking foot of the threaded insert so as to embed the threaded insert for use in receiving the screw that secures other layers to the radar system. The mechanically-locking foot can be configured to conform at least generally to a shape and depth of the opening that is etched into the substrate layer. The threaded insert can include a body portion that is threaded on an inner surface and is cylindrical in shape or other shape. The heat sink layer that is adhered to the radar system utilizing the screw can include a cavity that is complementary to a head of the screw and to enable the heat sink layer to be secured to the patch antenna array. In another aspect, the heat sink layer is not adhered to the radar system utilizing the screw where the screws do not have heads. The heat sink layer can be adhered to the radar system according to a number of different approaches. On approach can utilize a cavity that is complementary to a head of the screw to enable the heat sink layer to be secured to the patch antenna array. Another approach can be completely independent of the use of the screw where the screw does not have a head. Even if the screw does have a head, the head may not be used for adhering the layer as the screw mainly can fulfill the role of a gap filler and is ultimately removed.

Another aspect of this disclosure can include a radar system generated by a process including generating a first substrate layer adjacent to a ground plane of a patch antenna array in the radar system, etching an opening in the substrate layer, inserting a mechanically-locking foot of a threaded insert into the opening, inserting a coated plug into the threaded insert, adding a second substrate layer adjacent to the first substrate layer to embed the threaded insert, adding a third substrate layer covering the threaded insert and coated plug, etching an opening in the third substrate layer to enable removal of the coated plug, applying a thermal coupling between a heat sink layer and the third substrate layer of the radar system and screwing a screw through the heat sink layer and into the threaded insert to adhere the heat sink layer to the patch antenna array.

The second substrate layer can cover a portion of the mechanically-locking foot of the threaded insert so as to embed the threaded insert for use in receiving the screw that secures other layers to the radar system. The mechanically-locking foot can be configured to conform at least generally to a shape and depth of the opening that is etched into the substrate layer. The threaded insert can include a body portion that is threaded on an inner surface and is cylindrical in shape.

In some embodiments, the configuration disclosed herein can be used in connection with computer-readable storage devices, mediums, and memories and can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Any computer-based methods can be implemented to perform operations that are related in some fashion to the structure described above with respect to using an embedded threaded element in a substrate of a radar system. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on. Any token or structure/function disclosed herein can apply to a tokenized asset offering or a security token offering.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further, although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment," "variation," "aspect," "example," "configuration," "implementation," "case," and any other terms which may connote an embodiment, as used herein to describe specific features of configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other in any combination.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates the one member of the set or multiple members of the set satisfy the claim. For example, claim language reciting "at least one of A, B, and C" or "at least one of A, B, or C" means A alone, B alone, C alone, A and B together, A and C together, B and C together, or A, B, and C together.

We claim:

1. A radar system comprising:
    a first layer having an array of antennas configured thereon;
    a ground plane layer;
    a first substrate layer having an etched opening therein;
    a threaded insert having a body and a mechanically-locking foot, wherein the mechanically-locking foot of the threaded insert is embedded in the etched opening;
    a second substrate layer adjacent to the first substrate layer and covering at least a portion of the mechanically-locking foot of the threaded insert to secure the threaded insert in the first substrate layer and the second substrate layer;
    a second layer having an opening configured therein to enable access to the threaded insert;
    a heat sink having a hole configured therein; and
    a screw configured to screw through the hole in the heat sink, through the opening configured in the second layer and into the threaded insert to removably secure the heat sink to the first layer.

2. The radar system of claim 1, wherein the first substrate layer is adjacent to the ground plane layer.

3. The radar system of claim 1, wherein the screw is configured to screw into the threaded insert but not touch the ground plane layer.

4. The radar system of claim 1, wherein a thermal compound connects the second layer to the heat sink, wherein the thermal compound is not an adhesive.

5. The radar system of claim 1, further comprising the first substrate layer having a plurality of etched openings therein and each opening of the plurality of etched openings receiving a respective threaded insert having a respective mechanically-locking foot.

6. The radar system of claim 4, wherein the thermal compound comprises a thermal paste.

7. The radar system of claim 1, further comprising a layer covering an outer surface of the first layer having the array of antennas, wherein the outer surface of the first layer is generally flat.

8. The radar system of claim 1, wherein the opening configured within the second layer is etched after the second layer is added.

9. The radar system of claim 4, wherein the heat sink is detachable from the radar system via removing the screw and removing the thermal compound.

10. A method comprising:
    generating a first substrate layer adjacent to a ground plane of a patch antenna array in a radar system;
    etching an opening in the substrate layer;
    inserting a mechanically-locking foot of a threaded insert into the opening;
    inserting a coated temporary plug into the threaded insert;
    adding a second substrate layer adjacent to the first substrate layer to embed the threaded insert;
    adding a third layer that covers the threaded insert and coated temporary plug;
    etching an opening in the third layer to enable removal of the coated temporary plug;
    applying a thermal coupling between a heat sink layer and the third substrate layer of the radar system; and
    screwing a screw through the heat sink layer and into the threaded insert to removably adhere the heat sink layer to the patch antenna array.

11. The method of claim 10, wherein the second substrate layer covers a portion of the mechanically-locking foot of the threaded insert so as to embed the threaded insert for use in receiving the screw that secures other layers to the radar system.

12. The method of claim 10, wherein the thermal coupling is not an adhesive coupling between layers.

13. The method of claim 10, wherein the mechanically-locking foot is configured to conform at least generally to a shape and depth of the opening that is etched into the substrate layer.

14. The method of claim 10, wherein the threaded insert comprises a body portion that is threaded on an inner surface and is cylindrical in shape.

15. The method of claim 10, wherein the heat sink layer is adhered to the radar system according to one of: (1) utilizing a cavity that is complementary to a head of the screw to enable the heat sink layer to be secured to the patch antenna array; or (2) independent of use of the screw.

16. A radar system generated by a process comprising:
   generating a first substrate layer adjacent to a ground plane of a patch antenna array in the radar system;
   etching an opening in the substrate layer;
   inserting a mechanically-locking foot of a threaded insert into the opening;
   inserting a coated plug into the threaded insert;
   adding a second substrate layer adjacent to the first substrate layer to embed the threaded insert;
   adding a third substrate layer covering the threaded insert and coated plug;
   etching an opening in the third substrate layer to enable removal of the coated plug;
   applying a thermal coupling between a heat sink layer and the third substrate layer of the radar system; and
   screwing a screw through the heat sink layer and into the threaded insert to adhere the heat sink layer to the patch antenna array.

17. The radar system of claim 16, wherein the second substrate layer covers a portion of the mechanically-locking foot of the threaded insert so as to embed the threaded insert for use in receiving the screw that secures other layers to the radar system.

18. The radar system of claim 16, wherein the thermal coupling is not an adhesive coupling between layers.

19. The radar system of claim 16, wherein the mechanically-locking foot is configured to conform at least generally to a shape and depth of the opening that is etched into the substrate layer.

20. The radar system of claim 16, wherein the threaded insert comprises a body portion that is threaded on an inner surface and is cylindrical in shape.

* * * * *